(12) United States Patent
DeAndrea et al.

(10) Patent No.: US 11,743,159 B2
(45) Date of Patent: *Aug. 29, 2023

(54) OPTICAL LINK TIME-OF-FLIGHT AND TRAFFIC LATENCY DETERMINATION USING OPTICAL TRANSCEIVER

(71) Applicant: II-VI Delaware, Inc., Wilmington, DE (US)

(72) Inventors: John J. DeAndrea, New Hope, PA (US); Massimo Di Blasio, Princeton, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,832

(22) Filed: Jul. 11, 2022

(65) Prior Publication Data
US 2022/0353162 A1 Nov. 3, 2022

Related U.S. Application Data

(62) Division of application No. 17/073,078, filed on Oct. 16, 2020, now Pat. No. 11,425,013.

(60) Provisional application No. 62/916,248, filed on Oct. 17, 2019.

(51) Int. Cl.
*H04L 43/08* (2022.01)
*H04L 43/0852* (2022.01)
*H04B 10/077* (2013.01)
*H04B 10/079* (2013.01)

(52) U.S. Cl.
CPC ...... *H04L 43/0858* (2013.01); *H04B 10/0775* (2013.01); *H04B 10/0777* (2013.01); *H04B 10/07955* (2013.01)

(58) Field of Classification Search
CPC ........... H04L 43/0858; H04B 10/0775; H04B 10/0777; H04B 10/07955; H04B 10/00; H04J 3/0682
See application file for complete search history.

(56) References Cited

U.S. PATENT DOCUMENTS

| | | | |
|---|---|---|---|
| 9,998,254 B2 | 6/2018 | Deandrea | |
| 10,615,905 B2 | 4/2020 | Deandrea | |
| 10,721,011 B2 | 7/2020 | Deandrea | |
| 10,903,932 B2 | 1/2021 | Deandrea | |
| 2009/0052431 A1* | 2/2009 | Kroener | H04J 3/0664 370/350 |

(Continued)

*Primary Examiner* — Steven H Nguyen
(74) *Attorney, Agent, or Firm* — Blank Rome LLP

(57) ABSTRACT

A method for determining timing information in an optical communication link includes transmitting a falling edge from a transceiver positioned at a near end of the optical communication link and simultaneously starting a first timer at the transceiver positioned at the near end of the link. The transmitted falling edge is received at a transceiver positioned at a far end of the link. A falling edge is transmitted from the transceiver positioned at the far end of the link after a response delay. The transmitted falling edge is received at the transceiver positioned at the near end of the link while the first timer is simultaneously terminated at the transceiver positioned at the near end of the link and the elapsed time is recorded. The total link delay is determined based on the elapsed time.

20 Claims, 9 Drawing Sheets

(56) References Cited

U.S. PATENT DOCUMENTS

| | | | |
|---|---|---|---|
| 2009/0285520 A1* | 11/2009 | Kaplan | G01M 11/083 385/12 |
| 2015/0104167 A1* | 4/2015 | Bottari | H04B 10/2513 398/16 |
| 2017/0180070 A1* | 6/2017 | Ruffini | H04J 3/0667 |

* cited by examiner

| GLASS REFRACTIVE INDEX | 1.4682 | NEFF |
|---|---|---|
| SPEED OF LIGHT (VACUMN) | 299,792,458 | C |
| SPEED IN GLASS @ NEFF | 204,190,476.8 | m/s |
| TIME/METER | 4.89739E-09 | ns |
| RESOLUTION @ 10 NS | 2.04 | m |

OPTICAL LINK TIME-OF-FLIGHT AND TRAFFIC LATENCY DETERMINATION USING OPTICAL TRANSCEIVER

CROSS-REFERENCE TO RELATED APPLICATIONS

This application is a divisional of U.S. patent application Ser. No. 17/073,078, filed Oct. 16, 2020, which claims the benefit of U.S. Prov. Appl. 62/916,248 filed 17 Oct. 2019, both of which are incorporated herein by reference in their entireties.

BACKGROUND OF THE DISCLOSURE

Expanding mobile bandwidth, Internet business services, cloud computing, and residential broadband services require higher bandwidth to support wireless backhaul, data center and enterprise connectivity, and local access. In addition to bandwidth, these applications demand more capability and services from lower layers in the network to accelerate service deployment and support streamlined network turn-up, operation, and management.

Optical transceivers and links for these applications need to support higher data rates and multiple signaling formats using direct detection and/or coherent detection. To support the range of demanding optical network applications, modular pluggable optical modules use discrete optical components, such as optical transceivers for sending and receiving optical client data traffic across a variety of optical links and networks. These modules can support a variety of protocols and data rates and can be capable of supporting optical spans ranging from very short reach (e.g., within a data center) to mid-range reach (e.g., across campus, access, metro distances) as well as long-haul reaches. Finally, the modules can have any of a number of commercial form factors.

Increasingly, diagnostics interfaces provide performance information on the communication link. For example, users can remotely monitor, often in real-time, metrics including received optical power, transmitted optical power, laser bias current, transceiver input voltage, remote serial number, module type, and transceiver temperature of any transceiver in the network. Control can also be performed on transceivers. For example, the wavelength can be controlled in a tunable transceiver.

Although these digital diagnostic functions provide network managers with a highly accurate, cost-effective tool for implementing reliable performance monitoring of their networks, current optical network elements are configured largely via client interfaces. In many known systems, little or no management information is exchanged directly between the optical elements, such as transceivers, wavelength selective switches, amplifiers, and other elements in the optical network.

Furthermore, current optical network systems must send a large amount of diagnostic information from network elements to one or more external network management systems or users for processing and subsequent action based on that processing. For example, prior art optical link systems are typically controlled by upper-layer control plane software. These prior art optical link systems determine link lengths using off-line systems and performance monitors. Network operators must rely on the framers and upper-layer control software for measuring the length and delay between the transceivers. The upper layer typically sends time stamps within packets, decodes these time stamps, and compares frames to calculate the latency in these prior art optical links. This architecture limits scale and increases the time it takes to configure and operate the networks.

As the applications that use optical networks become more sophisticated, there is greater demand for even more capable pluggable optical transceivers and links. For example, there is a need for transceivers and/or optical data links that provide timing references in optical links and networks.

The subject matter of the present disclosure is directed to overcoming, or at least reducing the effects of, one or more of the problems set forth above.

SUMMARY OF THE DISCLOSURE

A method according to the present disclosure is implemented by a first transceiver in communication with an optical link. For example, the method can be implemented at a first (e.g., near-end) transceiver for determining timing information in an optical communication link to a second (e.g., far-end) transceiver.

A total link delay in the optical link is stored at the first transceiver. First and second edges separated by an average of the total link delay are transmitted from the first transceiver via a first path of the optical link. A third edge is received at the first transceiver via a second path of the optical link, and a first timer is simultaneously started. The third edge is associated with transmission through the optical link in response to receipt of the second edge. A fourth edge is received at the first transceiver via the second path, and the first timer is terminated. The fourth edge is associated with transmission through the optical link after the total link delay in response to receipt of the first edge. A shorter path delay of the first and second paths is determined based on elapsed time of the first timer.

A method is implemented by a first transceiver in communication with an optical link. For example, the method is implemented at a first (e.g., far-end) transceiver is used for determining timing information in an optical communication link to a second (e.g., near-end) transceiver.

The far-end transceiver stores a total link delay in the optical communication link. A first edge is received at the far-end transceiver through the optical link, and the far-end transceiver simultaneously starts a wait timer for the total link delay. A second edge is received at the far-end transceiver through the optical link at a time period of half of the total link delay after the first edge. The far-end transceiver transmits a third edge (typically after a response time) in response to receipt of the second edge, and the far-end transceiver transmits a fourth edge after the wait timer equal to the total link delay has elapsed so a shorter path delay can be determined based on an elapsed time between the third and fourth edges.

According to the present disclosure, a first (e.g., near-end) transceiver is connected in communication with an optical link. The near-end transceiver comprises: an optical interface in communication with the optical communication link; memory having a first timer; a processing unit connected to the fiber connection interface and the memory. The processing unit is configured to: transmit, via the first path, first and second edges separated by an average of the total link delay; receive, via the second path, a third edge and simultaneously starting a first timer, the third edge being associated with transmission through the optical link in response to receipt of the second edge; receive, via the second path, a fourth edge and terminating the timer, the fourth edge being associated with transmission through the optical link after the total link delay in response to receipt of the first edge;

and determine a shorter path delay of the first and second paths based on elapsed time of the timer.

According to the present disclosure, a first (e.g., far-end) transceiver is connected in communication with an optical link. The far-end transceiver comprises: an optical interface in communication with the optical communication link; memory having a timer and storing a wait time, the wait time equal to a total link delay in the optical communication link between the first and second transceivers; and a processing unit connected to the fiber connection interface and the memory.

The processing unit is configured to: receive, at the optical interface via the first path, a first edge through the optical link and simultaneously start the timer for the wait time; receive, at the optical interface via the first path, a second edge through the optical link at a time period of half of the total link delay after the first edge; transmit a third edge from the optical interface via the second path in response to receipt of the second edge; transmit a fourth edge from the optical interface via the second path after the wait time equal to the total link delay; and determine a shorter path delay of the first and second paths based on elapsed time between the third and fourth edges.

The foregoing summary is not intended to summarize each potential embodiment or every aspect of the present disclosure.

DESCRIPTION OF VARIOUS EMBODIMENTS

The present disclosure is directed to a method and apparatus that can extend the capability of hardware-configured network elements to determine and provide timing and latency information using optical link elements, e.g., transceivers, directly. In this way, the optical link elements can incorporate capable performance metric collection and diagnostic tools to simplify network management tasks.

For example, a hardware-configured network using the method and apparatus of the present disclosure may rely less, or not at all, on external network management systems to determine and provide timing and latency information. Instead, the hardware-configured network may use the network elements of the present disclosure to perform a number of timing and latency functions that had previously been performed by external systems. These timing and latency function can be used in addition to any another signaling techniques and protocols between various combinations of elements in the hardware-configured network. See, for example, U.S. Pat. No. 9,998,254, entitled "Method and Apparatus for Hardware Configured Network", which is assigned to the present assignee and incorporated herein by reference. See also, U.S. patent application Ser. No. 16/159,698, entitled "Method and Apparatus for Hardware Configured Network", which is also assigned to the present assignee and incorporated herein by reference.

As will be appreciated, the ability to operate and optimize an optical networks can require accurate knowledge of time information. In the optical network, delay time, also referred to as latency, between a transmitter and a receiver is proportional to the length of the fiber and propagation through various network elements in the fiber path. In many configurations, the length of the fiber dominates the total latency. Knowledge of time information, such as link delay and path length, can be used, for example, to support time-division multiplexing protocols, as well as to provide traffic latency, location, proximity, energy efficiency, mobility support and other wireless network features and requirements. Latency information is particularly useful, for example, in the 4G and 5G mobile networks.

Accurate timing measurements can also be used to aid in determination of fiber loss parameters and/or to characterize specific network losses that can be measured during startup or runtime. For example, if a path length is determined according to the teachings of the present disclosure, and an associated link loss is measured using, e.g. received signal-to-noise ratio, then fiber losses, and/or specific network path losses can be determined. Numerous component, link, and network attributes can be derived from timing information. The cases described above are just some of the examples.

Figures 1, 2A:
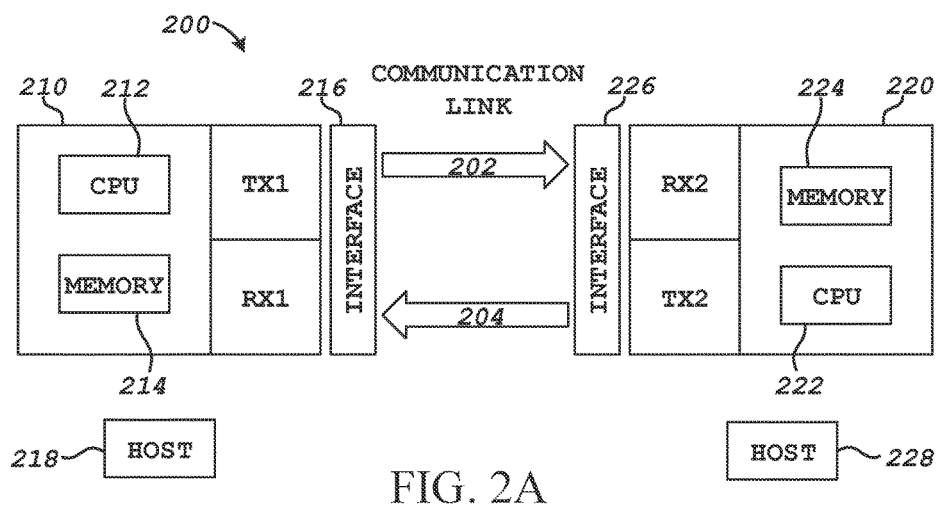
FIG. 1 illustrates a table detailing parameters relevant to calculations of fiber and fiber-based link metrics based on time-of-flight measurements.
FIG. 2A illustrates an optical link connecting two transceivers of the present disclosure.

To determine time-of-flight between network elements, the methods and apparatus of the present disclosure can use a number of parameters to accurately convert time-of-flight into path length and/or fiber length information. For example, FIG. 1 illustrates a table 100 detailing a number of example parameters relevant to calculations based on time-of-flight measurements according to the present disclosure.

Such parameters may apply to an optical link connecting two transceivers, which can incorporate the method and apparatus of the present disclosure. For example, FIG. 2A illustrates an optical link 200 connecting two transceivers 210, 220 of the present disclosure. Each transceiver 210, 220 has a processing unit 212, 222; memory 214, 224; transmitter (TX1, TX2); receiver (RX1, RX2); and optical interface 216, 226. Each transceiver 210, 220 can be associated with a corresponding host device 218, 228, such as typically used in a network environment of the present disclosure.

The transceivers 210, 220 can be optical pluggable modules configured as so-called smart modules. Due to layout and size constraints in the optical transceivers 210, 220, minimal added electronics are preferably used within the modules for the transceiver 210, 220.

The processing unit 212, 222 can use any appropriate microprocessor and memory hardware used for transceiver processing, and the processing unit 212, 222 can have diagnostics interfaces to provide performance information on the data link and directly from the modules. The memory can have storage for timers and can store information for calculating various details as disclosed herein.

As disclosed in more below, the method and apparatus of the present disclosure can provide accurate time measurements by using the pair of transceivers 210, 220, which are separated by a distance and are connected through optical fiber and/or other transport components. No other communication and/or connections to/from the transceivers 210, 220 in the pair may be needed to provide the time measurements, although such other communications and connection may also be used in some configuration.

A sequence is initiated subsequent to (or around the time of) start-up of this transceiver pair 210, 220 in the optical link 200. The sequence is used to measure the length of the connecting link 200 as well as to determine associated traffic latency, which can be used for the various purposes outlined herein. In general, the optical transceivers 210, 220 can be configured in a fixed, point-to-point arrangement; the optical transceivers 210, 220 can be configured in a WDM network; and the optical transceivers 210, 220 can be configured in a reconfigurable optical WDM network.

In contrast to prior art optical link systems typically controlled by upper-layer control plane software using off-line systems and performance monitors, the teachings of the present disclosure can assess the link delay, and/or client traffic latency, between the two optical transceivers 210, 220 connected between two physical locations (i.e., near and far ends) separated by a distance. The assessment can be done automatically and without communicating with an external input. In some embodiments, the latency is determined at start-up of the transceivers 210, 220, and so timing information is available within the transceivers 210, 220 well before a network controller (not shown) is booted and running to make such a measurement. No upper-layer control software may be necessary.

As can be seen, the method and apparatus of the present disclosure for determining timing information in optical links does not need to rely on using client traffic, bit patterns, or complex time stamped packets as typically used in many known systems. Instead, optical fiber lengths and timing information can be determined at the transceiver level on startup without the need for precise communication of time stamps to measure these lengths and latencies.

To achieve this, embodiments of the method and apparatus of the present disclosure can rely only on local transceiver timers, and transmission and reception of fast edges, which can be falling edges or leading edges. This allows precise high-resolution latency measurements at the link startup phase without the need to affect the client traffic. The timing information, which may include path lengths, fiber lengths, and/or latencies, can be stored in each transceiver 210, 220 at startup and/or can made available to other elements in the network, such as the local host 218, 228, external management systems, or other downstream systems.

Because the method and apparatus of the present disclosure may not rely on transmission of any data patterns, they are compatible with a wide range of known optical transceivers. For example, the transceivers 210, 220 of the present disclosure may operate using a variety of protocols, including Ethernet, Fibre Channel, Infiniband, SONET/SDH/OTN, CPRI and PON. The transceivers 210, 220 can operate at a variety of data rates, including, for example, 2.5 Gb/s, 10 Gb/s rates, 100 Gb/s and 400 Gb/s data rates. The transceivers 210, 220 can operate over distances ranging, e.g., from very short reach (~meters-100 s of meters) within a data center to mid-range (~<10 km) reach across campus, access, metro distances, as well as long-haul reaches (~>10 km). Additionally, the transceivers 210, 220 can be available in a number of form factors, including, for example, industry-standard XFP, SFP, SFP+, Coherent, CXP, QSFP+, and CFP form factors. The transceivers 210, 220 can be direct detection transceivers and/or coherent receivers. Also, the transceivers 210, 220 can be tunable or operate at a fixed wavelength.

Likewise, the transceivers 210, 220 used in methods and apparatus of the present disclosure can be smart transceiver modules, which can include, for example, features that allow autonomous operation without intervention of remote management or operators. Using the method and apparatus of the present disclosure on link startup, the transceivers 210, 220 can automatically measure the delay time between them by transmitting a single transition, say a falling edge transition or a leading edge transition, and a precision time measurement. In various embodiments, the transition can be an amplitude transition, a phase transition, or a frequency transition. The delay of the transition and the distances are calculated based on known parameters related to the fiber index of refraction and the speed of light. In addition to calculating distance of the fiber connection, the latency of the client data traffic can be given to the client for upper layer management of the network. This is possible even if the path lengths differ between the transmit and the receive pairs.

As noted previously, FIG. 1 illustrates a table 100 detailing a number of parameters to accurately convert time-of-flight into path length and/or fiber length information. As shown in this example, optical propagation speed in glass fiber is approximately 4.897 ns/m. The typical clock available in the microprocessors within a transceiver processor 212, 222 is typically in the range from 100 MHz to 400 MHz. Assuming a 100 MHz clock, the clock has a time separation of 10 ns. With a timer having this clock separation time, also referred to as time resolution or response delay of the timer or module that uses the timer, a measurement of time/distance can be defined at a length resolution of 2.04 meters for propagation in glass fibers. In general, the information such as in the table 100 can form a basis for measuring fiber length and latency of traffic transmission according to the present disclosure.

Discussion now turn to particular details of the optical link 200 shown in FIG. 2A connecting the two transceivers 210, 220 of the present disclosure. As shown, the first transceiver's transmitter (TX1) connects by a fiber path 202 to the second transceivers' receiver (RX2). Likewise, the first transceiver's receiver (RX1) connects by a fiber path to the second transceiver's transmitter (TX2). Depending on perspective, either one of the transceivers 210, 220 can be the "near-end" transceiver with the other being the "far-end" transceiver for the purposes of the present disclosure. In fact, each transceiver 210, 220 can be alternately operated as the "near-end" transceiver with the other being the "far-end" transceiver for the purposes of the present disclosure.

This optical link 200 configuration may be utilized, for example, in a data center application, including mass volume data center deployments. These mass volume deployments benefit from smart module automation that includes derivation of timing information with low cost implementation of the present teaching. In some embodiments, the length of the two fiber paths 202, 204 is nominally the same. This optical link 200 may be referred to as a duplex link or a bidirectional link.

Various arrangements for the optical interfaces 216, 226 can be used in the optical link 200 of the present disclosure. The interfaces 216, 226 can connect the transceiver pairs directly by optical fiber and may be in various known link configurations. For example, links may use grey, or standard, transceivers, which use a single channel and/or WDM transceivers. The transceivers 210, 220 may operate over short reach, long reach, extended reach, and further extended reach. Transceivers may work at 850 nm, 1310 nm and 1550 nm wavelengths. If bidirectional, the transceivers 210, 220 may use two independent wavelength channels, one for transmission and one for reception and may be connected via a single fiber or multiple fibers.

Figure 2B:
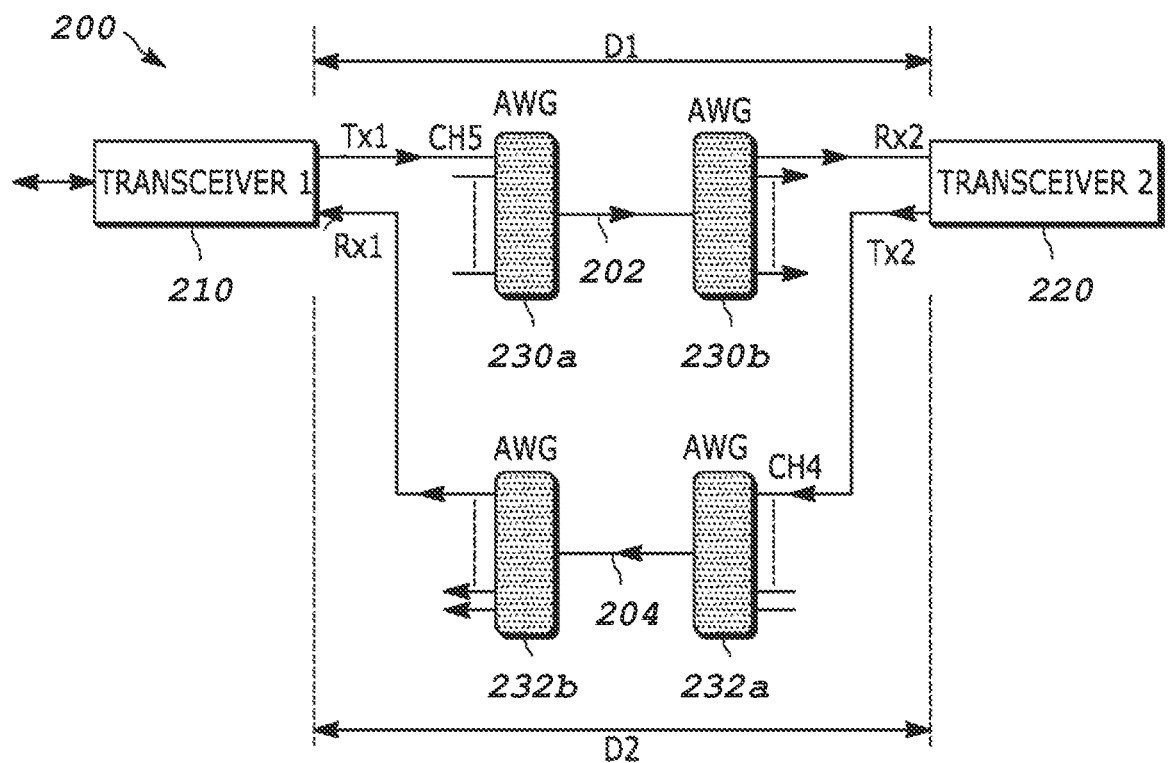
FIG. 2B illustrates an optical link using transceivers connected with array-waveguide grating (AWG) devices of the present disclosure.

FIG. 2B illustrates an embodiment of an optical link 200 using transceivers 210, 220 connected via array-waveguide grating (AWG) devices 230a-b, 232a-b of the present disclosure. A first pair of the AWGs 230a-b are connected via a unidirectional optical fiber link over fiber 202. A second pair of the AWGs 232a-b are connected via a unidirectional optical fiber link over fiber 220 that runs in the opposite direction. The path length D1 from the first transmitter (TX1) to the second receiver (RX2) represents the total optical path followed by light emitted from the first transmitter (TX1) and received at the second receiver (RX2). Note that this path length D1 is typically not equal to the physical distance between the transceivers 210, 220, rather the physical length of the fiber(s) that connects them. The physical separation distance of the transceivers 210, 220 may be close to the fiber length D1, but not exactly the same.

The other path length D2 from the first receiver (RX1) to the second transmitter (TX2) represents the total optical path followed by light emitted from second transmitter (TX2) and received at the first receiver (RX1). Depending on the network and/or fiber architecture, the two path lengths D1 and D2 can have slightly different fiber lengths. The value of relative difference in the fiber lengths depends on the physical layout of the link.

In some embodiments, the first transmitter (TX1) uses an edge (e.g., falling edge) to start a timer, and the second receiver (RX2) senses the edge, then immediately turns the second transmitter (TX2) off, returning this edge back to the first receiver (RX1). The first transceiver 210 can therefore measure the time delay, and calculate the distance and latency between the transceivers 210, 220.

As noted, the falling edge may be generated by simply turning off the respective transceiver, and/or by various modulating techniques. While the technique is described herein primarily with the use of a falling edge, the methods and apparatus of the present disclosure are not so limited to the use of a falling edge. For example, an edge in the form of a falling edge, a rising edge, and/or various pulse transmissions can be used.

Figure 2C:
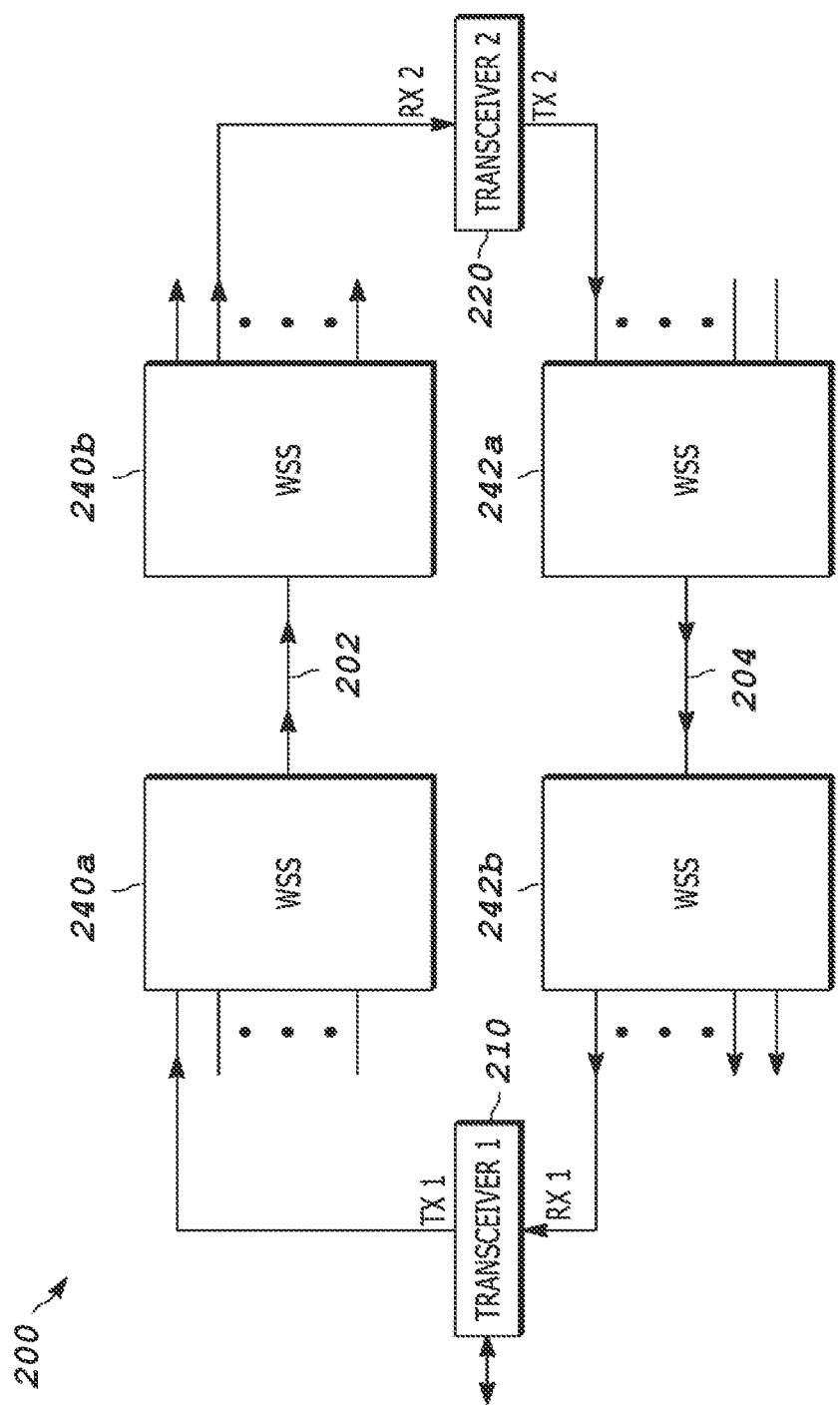
FIG. 2C illustrates an optical link using transceivers connected using wavelength selective switch (WSS) devices of the present disclosure.

FIG. 2C illustrates an embodiment of an optical link 200 using transceivers 210, 220 connected via wavelength selective switch (WSS) devices 240a-b, 242a-c of the present disclosure. A first pair of the WSS 240a-b are connected via a unidirectional optical fiber link using fiber 202 directed in the forward path. A second pair of the WSS 242a-b are connected via a unidirectional optical fiber link using fiber 204 directed in the reverse path. The path length from the first transmitter (TX1) to the second receiver (RX2) represents the total optical path followed by light emitted from first transmitter (TX1) and received at the second receiver (RX2). The path length from the first receiver (RX1) to the second transmitter (TX2) represents the total optical path followed by light emitted from second transmitter (TX2) and received at the first receiver (RX1).

Depending on the network and/or fiber architecture, the two path lengths can have slightly different fiber lengths is some configurations or significantly difference fiber lengths in other configurations. Furthermore, in some embodiments, either of the two path lengths can change if one or more of the WSS 240a-b, 242a-b are reconfigured.

In some embodiments, the first transmitter (TX1) uses a falling edge to start a timer, and the second receiver (RX2) senses the edge, then immediately turns the second transmitter (TX2) off, returning this edge back to the first receiver (RX1). A timer in the first transceiver 210 can therefore be used to measure the time delay, and calculate the distance and latency between the transceivers 210, 220.

Figure 2D:
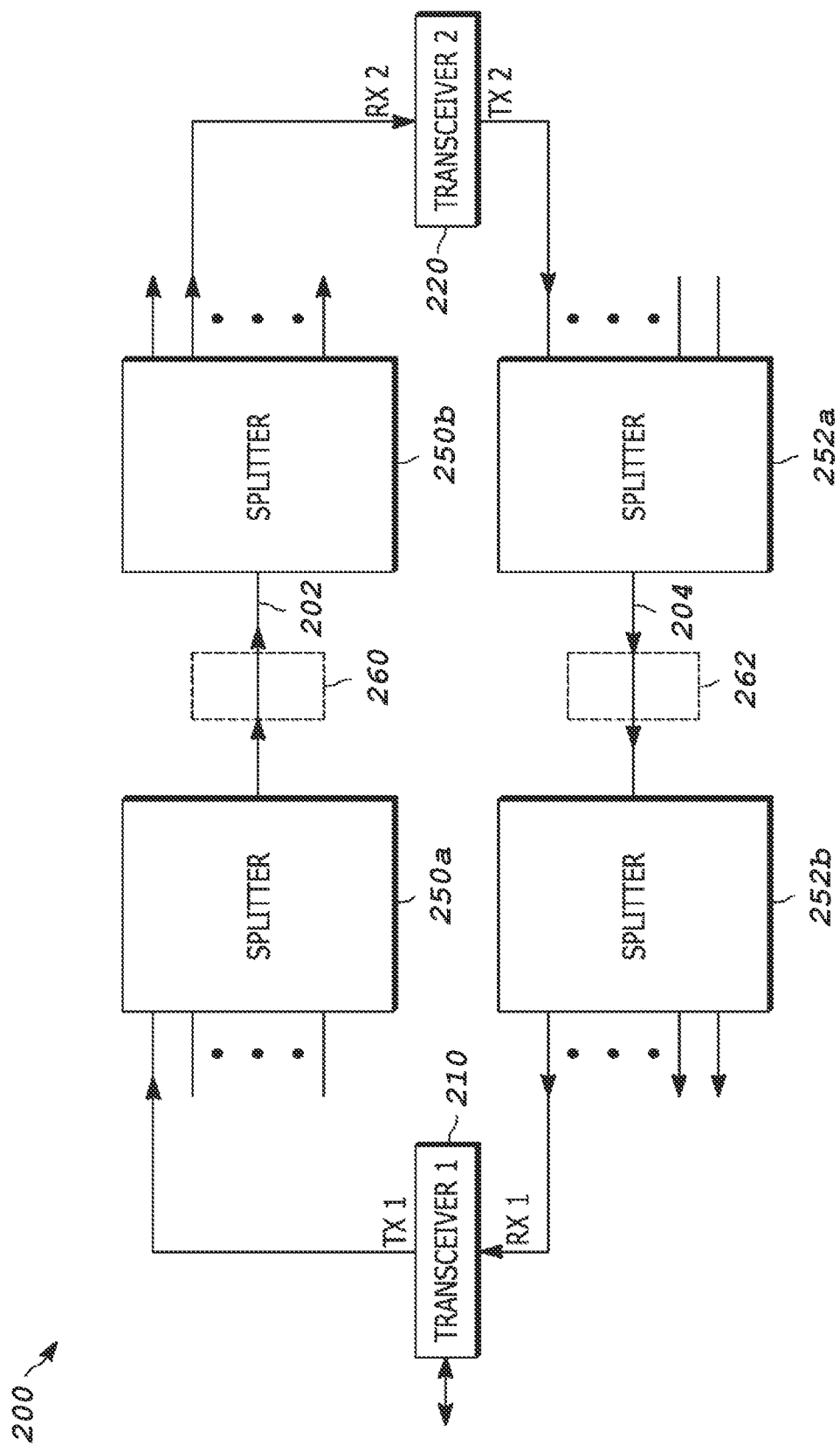
FIG. 2D illustrates an optical link using transceivers connected with splitter devices of the present disclosure.

FIG. 2D illustrates an embodiment of an optical link 200 using transceivers 210, 220 connected via splitter devices 250a-b, 252a-b of the present disclosure. The splitter devices 250a-b, 252a-b are not wavelength sensitive and/or pass more than one wavelength channel between two ports. A first pair of splitters 266, 268 are connected via a unidirectional optical fiber link using fiber 202. A second pair of splitters 252a-b are connected via a unidirectional optical fiber link using fiber 204. The path length from the first transmitter (TX1) to the second receiver (RX2) represents the total optical path followed by light emitted from the first transmitter (TX1) and received at the second receiver (RX2). The path length from the first receiver (RX1) to the second transmitter (RX2) represents the total optical path followed by light emitted from second transmitter (RX2) and received at the first receiver (RX1). Depending on the network and/or fiber architecture, the two path lengths can have slightly different fiber lengths. In some cases, for example 5G and/or radio systems, the two path lengths can have substantial, even few-kilometer, length differences.

In some embodiments, the first transmitter (TX1) uses a falling edge to start a timer, and the second receiver (RX2) senses the edge, then immediately turns the second transmitter (TX2) off, returning this falling edge back to the first receiver (RX1). Upon receipt of the falling edge at the first receiver (RX1), the timer in the first transceiver 210 is turned off. The first transceiver 210 can therefore determine the time delay, and calculate the distance and latency between the transceivers 210, 220.

In various embodiments, the fiber links 202, 204 can pass through additional, optional, optical amplifiers 260, 262. These optional optical amplifiers 260, 262 can be added to the link to address losses from the splitters 250a-b, 252a-b. The amplifiers 260, 262 can be placed anywhere between the first transceiver 210 and the second transceiver 220 to address losses in the link as understood by those skilled in the art.

Figure 2E:
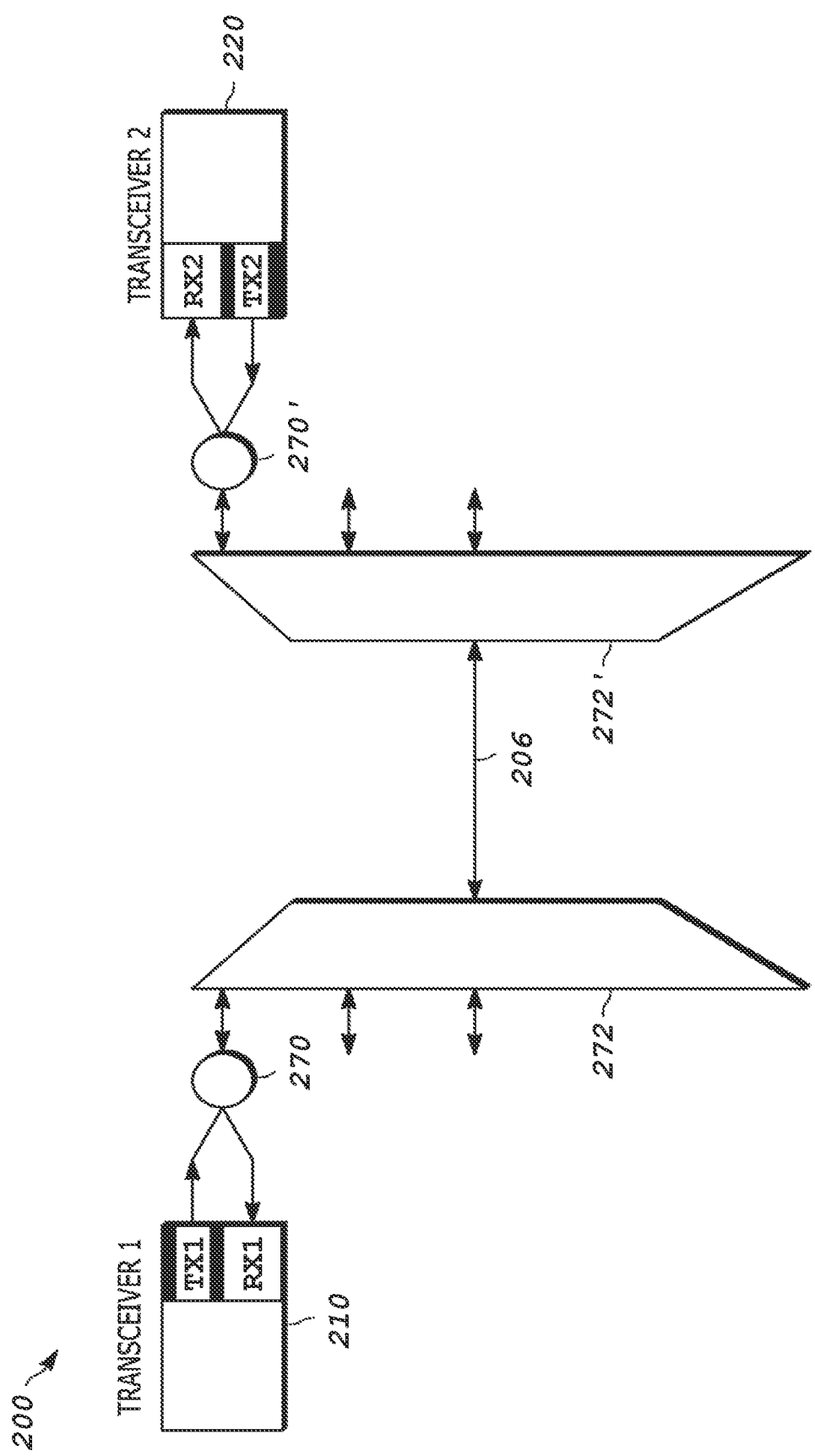
FIG. 2E illustrates an optical link using transceivers connected with a bidirectional link fiber of the present disclosure.

FIG. 2E illustrates an embodiment of an optical link 200 using transceivers 210, 220 connected via a bidirectional link fiber 206 of the present disclosure. A first transmitter (TX1) of the first transceiver 210 is connected to a port of a 1×2 splitter 270. An input of the first receiver (RX1) of the first transceiver 210 is connected to a second port of the 1×2 splitter 270. The third port of the 1×2 splitter 270 is connected to an AWG 272. The AWG 272 combines the light from each input port to a fiber 206 that carries bidirectional optical signals and is connected to AWG 272'. An output port of the AWG 272' is connected to one port of 1×2 splitter 270'. The second receiver (RX2) is connected to another port of the 1×2 splitter 270'. The second transmitter (TX2) is connected to a third port of the 1×2 splitter 270'. In some embodiments, the transceivers 210, 220 are located remotely, for example up to a few kilometers away, from the respective AWG 272, 272'. This configuration is sometimes referred to as a remote PHY configuration.

In this optical link 200, both sides of the link need the transceivers 210, 220 to operate on the same wavelength channel because the wavelength must pass through the filter of the AWGs 272, 272'. In this embodiment, the path length between the first transmitter (TX1) and second receiver (RX2), and the path length between second transmitter (TX2) and first receiver (RX1) are nearly the same because the light travels through nearly all the same components, just in opposite directions. Thus, some embodiments of the present teaching that use bidirectional links may not need to perform either or both of the steps of determining the shortest path delay and/or determining which length is longer because determining the round-trip, or total, link delay provides the necessary information.

In some embodiments, the first transmitter (TX1) uses a falling edge to start a timer, and the second receiver (RX2) senses the edge, then immediately turns the second transmitter (TX2) off, returning the resulting falling edge back to the first receiver (RX1), and the timer is turned off when the falling edge is received at first receiver (RX1). The first transceiver 210 can therefore measure the time delay, and calculate the distance and latency between the transceivers 210, 220.

In various embodiments, the transmitters and receivers in the various transceivers 210, 220 described in connection with FIGS. 2A-2E may be coherent devices, direct detection devices, or other known varieties of transceivers used in optical links and networks.

Figure 3:
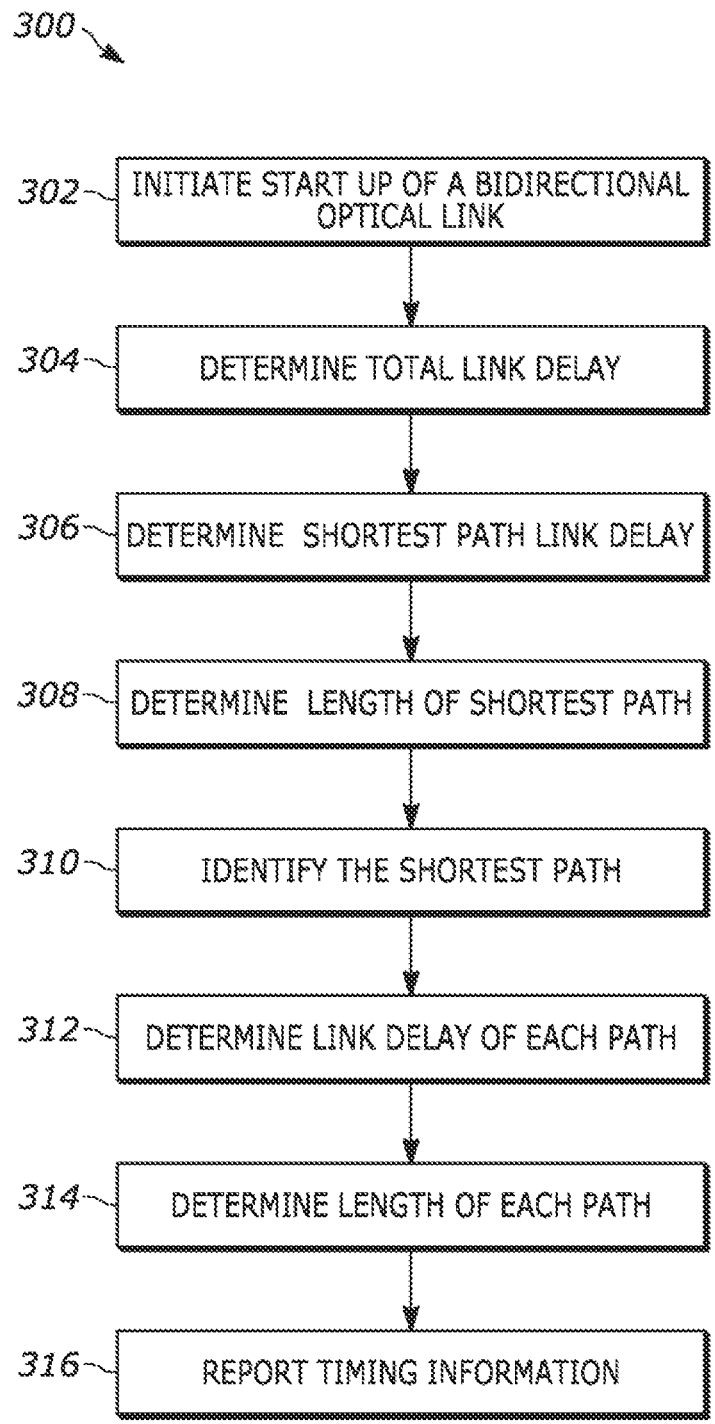
FIG. 3 illustrates a flow chart showing steps to determine timing information in an optical link of the present disclosure.

FIG. 3 illustrates steps in a method 300 to determine timing information in an optical link of the present disclosure. The method 300 can begin at initiation of link startup (step 302). In general, the method 300 can begin before client data traffic is running on the link. However, the method 300 is not limited to begin during a startup operation. Rather, the method 300 can start automatically and/or start based on input from a user of other system at various times during the life cycle of the link. One benefit of implementing the method 300 at startup is that there is no client data traffic on the link, and so there is no interference with client data traffic from the implementation of various steps of the method.

A total link delay is determined (step 304). As disclosed above, the optical link 200 has two ends, each connected to a transceiver 210, 220. The two ends are sometimes referred to as a near-end and a far-end. The total, round trip, link delay is determined by implementation of a round trip protocol in which a first edge (e.g., falling edge) is transmitted from the near-end of the link to the far-end. The transmit of the first falling edge starts a timer. Receipt of that first falling edge at the far-end triggers a second falling edge to be transmitted from the far-end. Receipt of the second falling edge transmitted by the far-end at the near-end stops the timer. The time measured by the timer, corrected, as appropriate, for any transmission delays and/or reception delays in the transceivers, is the round trip delay, or total link delay.

A feature of the present disclosure is that the protocol can operate using single transitions, such as falling edges or rising edges. Thus, one or more data "bits" do not need to be transmitted and received to determine timing. One skilled in the art should appreciate that the present disclosure is not limited to the use of a single transition, such as a falling or rising edge, however, this feature provides a substantial simplification in the optoelectronic components and associated electronic circuits that may be used to implement the protocol.

Continuing in the method 300, the shortest path link delay is determined (step 306). Here, first and second falling edges are transmitted from the near-end. These first and second falling edges are separated by the measured total link delay divided by two, the average link delay. The total link delay can, for example, be determined by the previous steps (i.e., step 304).

At the far-end, a third falling edge is sent back to the near-end after the first falling edge is received plus a wait time equal to the round trip delay. After the second falling edge is received at the far-end, a further falling edge is sent after a response delay. At the near-end, a second timer is started on receipt of the third falling edge and ended on an arrival of the fourth falling edge. The measured time by the near-end's second timer is used to calculate the delay time for the shortest link.

The length of the shortest span is determined based on the calculated delay time (step 308). The measured delay is converted into length using, for example, the parameters presented in the table 100 of FIG. 1.

Optionally, the shortest path link is identified (step 310). In various embodiments, a variety of protocols can utilize time stamping and/or marking and correlation. This optional identification of step 310 may not be necessary in cases where the link is bidirectional and shares a common fiber path in both directions, where the link is known a priori to have the same path length in each direction, or where the shortest link is pre-identified.

A link delay of each path is determined using previous information (step 312). The determination uses information of (i) the determined total delay, (ii) the determined shortest delay, and (iii) the knowledge that the paths are the same length or the knowledge of which path is shortest. This information can be determined, for example, in the previous steps 304, 306, 310.

A fiber length of each path is determined (step 314). All or some of the timing information is then reported (eighth step 316). The timing information may be sent to other elements (e.g., 218, 228 of FIG. 2A) in the network, a network management system, another network, a network service, a user, or other known applications that require timing and delay information.

In the following descriptions associated with FIGS. 4-6 references to first and second transmitters (TX1, TX2) and receivers (RX1, RX2) can be associated with those described in connection with any of FIGS. 2A-2E, or generally to transmitters (TX1, TX2) and receivers (RX1, RX2) located in a near-end (first) transceiver 210 and a far-end (second) transceiver 220 of an optical link 200.

Figure 4:
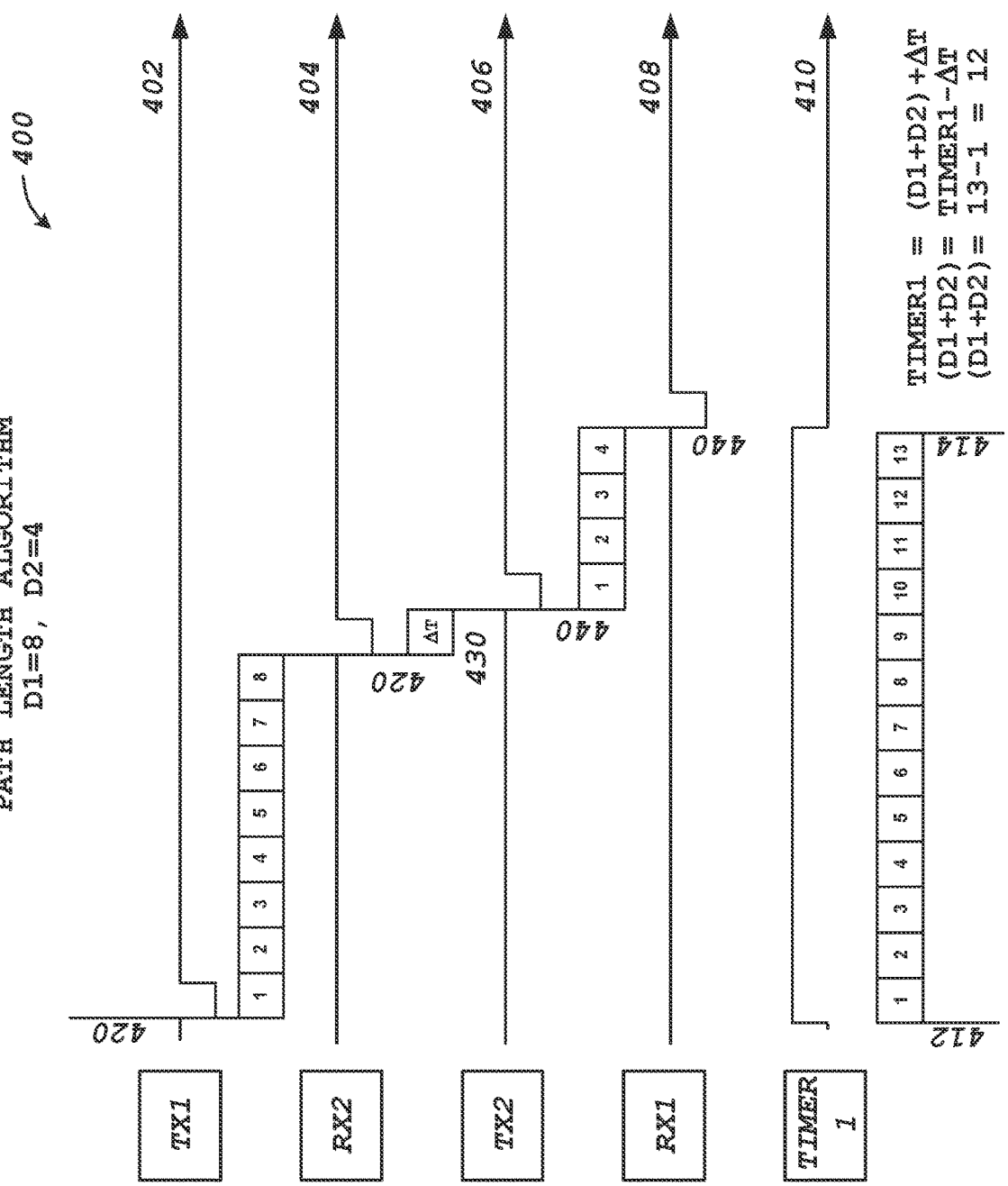
FIG. 4 illustrates a timing diagram for an algorithm to determine total link delay in an apparatus and method of the present disclosure.

FIG. 4 illustrates a timing diagram 400 for an algorithm used to determine total link delay for an apparatus of the present disclosure. The timing diagram 400 represents an example algorithm for the second step 304 of the method 300 described in connection with FIG. 3. Timing diagram 400 is intended to illustrate the principal of operation of the algorithm. For simplicity, the timing diagram uses arbitrary integer units of delay. Various embodiments of the apparatus and method of the present disclosure utilize time units that are appropriate for the system path lengths and response times associated with that embodiment.

In the example of FIG. 4, the first path, which is from the near-end to far-end, has a delay of eight units. Meanwhile, the second path, which is from far-end to near-end, has a delay of four units. Thus, the round trip delay is twelve units.

Timing traces that are shown include the near-end transmitter's timing trace 402, the far-end receiver's timing trace 404, the far-end transmitter's timing trace 406, the near-end receiver's timing trace 408, and the first near-end timer's timing trace 410.

To determine the total link delay, the algorithm proceeds in the following way. In trace 402, the near-end transmitter TX1 sends a transmit falling edge 420. Simultaneously in trace 410, the near-end timer is started, as given by on-state 412. In trace 404, the far-end receiver RX2 receives the falling edge 420 eight units later because this is the length of the path from TX1 to RX2. In response, the far-end transmitter TX2 in trace 406 transmits a falling edge 440. There is a response delay 430, $\Delta T$, of one unit in this example due to a detection and transmission response time in the far-end transceiver.

The response delay 430 can take on various values in various embodiments. For example, the response delay 430 can be determined by the response time of the electronics and/or configurations of the transceiver. The response delay 430 can be chosen to provide a desired response delay for the protocol. In some embodiments, the response delay 430 is predetermined and is known by both the near-end and the far-end transceivers.

The falling edge 440 from TX2 follows the return fiber path to the first receiver RX1. This path produces four units of delay, resulting in timing trace 408, which shows receipt of falling edge 440 in the first receiver RX1. Upon receiving the falling edge 440, the first timer (Timer1) in trace 410 is turned off, off-state 414, and the time is recorded. The time recorded by the first timer 410 is expressed as Timer1=D1+D2+$\Delta T$. Thus, D1+D2=Timer1−$\Delta T$. For this example, Timer1 measures thirteen units of delay, and $\Delta T=1$, so the total delay is twelve units.

Quantitatively, if one unit is equal to 10 ns in the present example, the distance is provided by Timer1 of the near-end as: Total Delay=D1+D2=[Timer1−$\Delta T$)]*[2.04 m per unit]. For this example, the link length may be 24.48 meters, for example, depending on the parameters of the fiber, effective index, etc. If one unit is equal to 1 microsecond, the distance is provided by Timer1 of the near-end as: Total Delay=D1+D2=[Timer1−$\Delta T$)]*[204 m per unit]. For this example then, the link length may be 2.448 kilometers.

In embodiments where the lengths of the paths in the two directions are known to be the same, then each path length is given by (Timer1−$\Delta T$)/2. Thus, if link lengths are known to be the same, then this algorithm is sufficient to obtain the timing measurement needed to provide both link lengths. In the example of FIG. 4, however, the lengths are not the same, being D1=8 and D2=4, and so additional steps of the method are needed to determine path delays for the individual link paths. Examples of these steps are described further below with reference to FIGS. 5-6.

Figure 5:
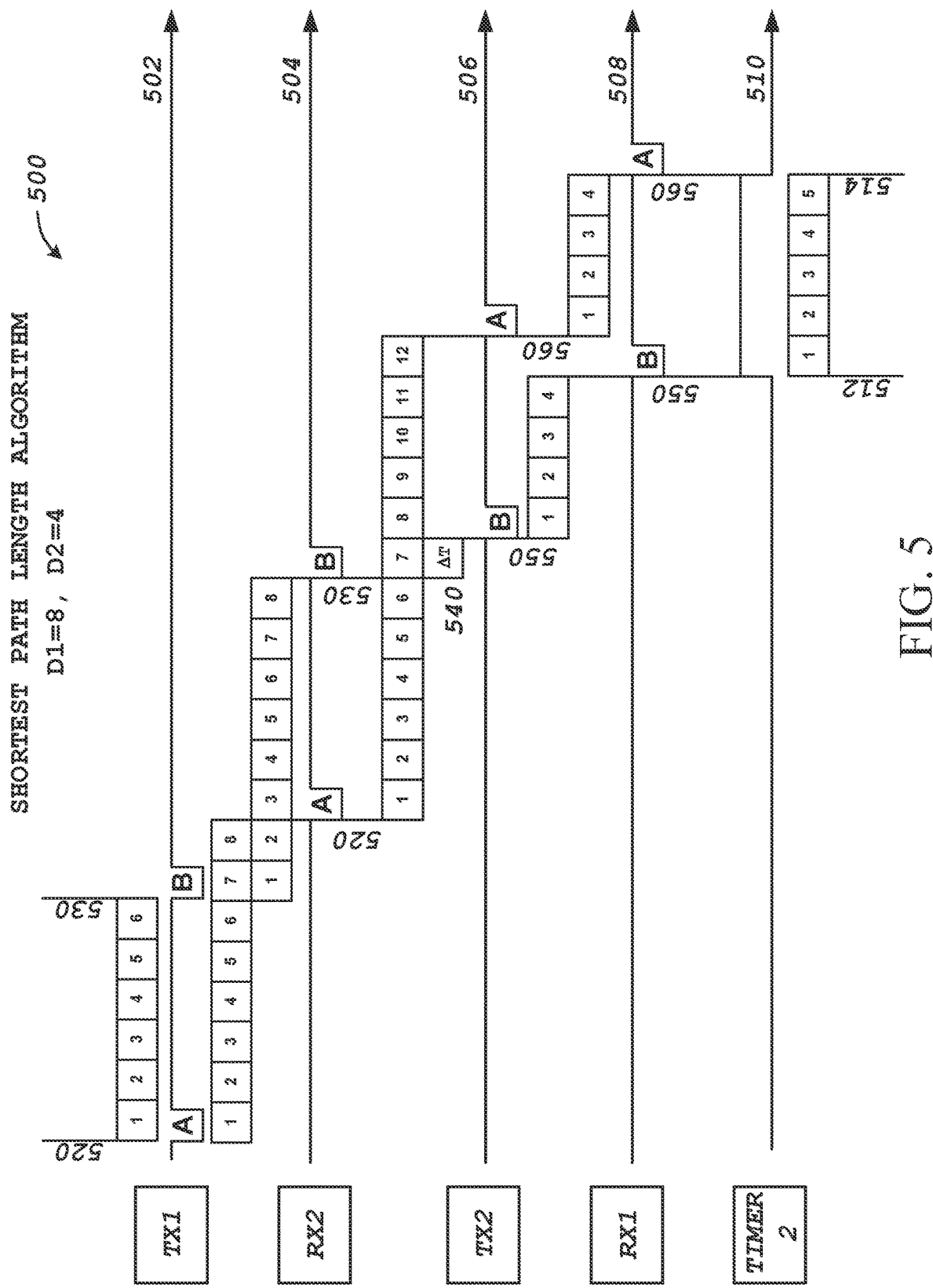
FIG. 5 illustrates a timing diagram for an algorithm to determine link delay of the shortest path in an apparatus and method of the present disclosure.

FIG. 5 illustrates a timing diagram 500 for an algorithm used to determine link delay of the shorter path in an apparatus and method of the present disclosure. Timing diagram 500 represents an example of the algorithm for step three 306 described in connection with FIG. 3. Timing diagram 500 is intended to illustrate the principal of operation of the algorithm and uses integer units of delay that are arbitrary. Various embodiments of the apparatus and method of the present teaching utilize time units that are appropriate for the system path lengths and response times.

In the example of FIG. 5, the first path, from near-end-to-far-end, has a delay of eight units. The second path, from far-end-to-near-end, has a delay of four units. The round trip delay is twelve units. This timing diagram 500 assumes that the total delay, twelve units, is already known, having been determined, for example, by previous steps of the method. This total delay is converted into an average delay for each path of six units each. Timing traces are shown for the near-end transmitter TX1's timing trace 502, the far-end receiver RX2's timing trace 504, the far-end transmitter TX2's timing trace 506, the near-end receiver RX1's timing trace 508, and a second near-end timer Timer2's timing trace 510.

To determine link delay of the shorter path, the algorithm proceeds as follows. In the trace 502, the near-end transmitter TX1 sends a first falling edge 520 and then a second falling edge 530 after a delay that equals the average round trip delay (i.e., six units). In some embodiments, the average round trip delay was determined in previous steps of the method. In trace 504, the far-end receiver RX2 receives the first receive falling edge 520 eight units after its transmission because this is the length of the path from the first transmitter TX1 to the second receiver RX2. The far-end receiver RX2 then receives the second falling edge 530 eight units after its transmission because this is the length of the path from the first transmitter TX1 to the second receiver RX2.

Upon receipt of that first receive falling edge 520, the far-end transmitter TX2 in trace 506 waits a total round trip delay (12 units) before ultimately transmitting a fourth falling edge 560. However, before that transmission, upon receipt of the second falling edge 530, the far-end transmitter TX2 in trace 506 sends a third falling edge 550, after a response delay 540, $\Delta T$, of one unit.

The third falling edge 550 from the far-end is received at the near-end receiver RX1 in trace 508 after the four units of delay associated with this path. The fourth falling edge 560 from the far-end is received at the near-end receiver RX1 in trace 508. Upon receipt of third falling edge 550, Timer2 of the first transceiver turns on, on-state 512 in trace 510. Upon receipt of the fourth falling edge 560, Timer2 shuts off, off-state 514.

Thus, to determine the link delay of the shorter link, two falling edges 520, 530 are sent from the near-end transmitter TX1 separated by an average link delay (e.g., six units). At the far-end transmitter TX2, two falling edges 550, 560 are also sent, one 560 after receipt of the first falling edge 520 plus a total link delay, and the other 550 after receipt of the second falling edge 530 plus a response delay ($\Delta T$) 540. At the near-end, a timer Timer2 is started after arrival of the third falling edge 550 transmitted by the far-end, and ended after arrival of the fourth falling edge 560. The time measured is recorded as elapsed time T2. Based on the measured timer value, T2, the delay time for the shortest link, X, is established by the equation, T2=X+$\Delta T$. In this example, T2=5 and $\Delta T=1$, and so the shorter path delay is calculated as four units, which in this example corresponds to the second path from the far-end to the near-end.

In the previous example, the shorter path delay happened to be the second path from the far-end to the near-end. The technique, however, can work in a comparable manner even if the shorter path delay is the first path from the near-end to the far-end. To that end, FIG. 6 illustrates a timing diagram 600 for another algorithm used to determine link delay of the shorter path in an apparatus and method of the present disclosure. The timing diagram 600 illustrates the principal of operation of the algorithm and uses integer units of delay that are arbitrary.

Figure 6:
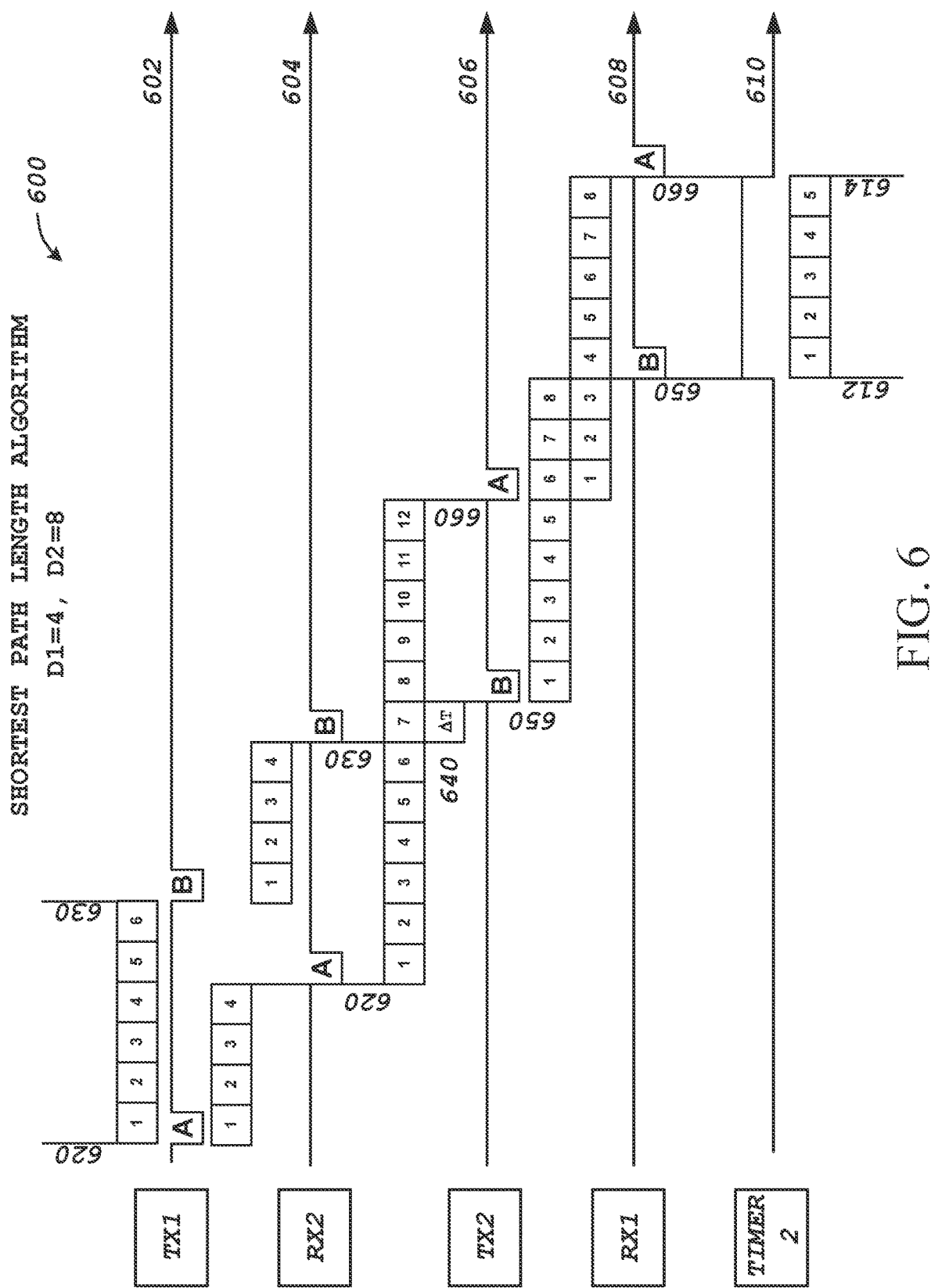
FIG. 6 illustrates another timing diagram for an algorithm to determine link delay of the shortest path in an apparatus and method of the present disclosure.

In the example of FIG. 6, the first path, from near-end to far-end, has a delay of four units, whereas the second path, from far-end to near-end, has a delay of eight units. Round trip delay is twelve units. This timing diagram 600 assumes that the total delay of twelve units is already known, having been determined by previous steps of the method. Timing traces are shown for the near-end transmitter TX1's timing trace 602, the far-end receiver RX2's timing trace 604, the far-end transmitter TX2's timing trace 606, the near-end receiver RX1's timing trace 608, and the second near-end timer Timer2's timing trace 610.

To determine the link delay of the shorter path, the algorithm can proceed in the following way. In trace 602, the near-end transmitter TX1 sends two falling edges 620, 630 separated by the average link delay, i.e., first falling edge 620 and then six units later second falling edge 630. The average delay was determined previous to this step.

In trace 604, the far-end receiver RX2 receives the falling edge 620 four units after it transmission because this is the length of the path from the first transmitter TX1 to first receiver RX1. Also in trace 604, the far-end receiver RX2 receives the second falling edge 630 four units later after its transmission because this is the length of the path from the first transmitter TX1 to the second receiver RX2.

Upon receipt of the first receive falling edge 620, the far-end transmitter TX2 in trace 606 waits the round trip delay, which is known, and transmits fourth falling edge 660. Before that transmission and upon receipt of the second falling edge 630, the far-end transmitter TX2 sends a third falling edge 650 after a response delay 640, $\Delta T$, of one unit. The third falling edge 650 transmitted by the far-end is received at the near-end receiver RX1 after the eight units of delay associated with this path. The fourth falling edge 660 sent by the far-end transmitter TX2 is received at the near-end transceiver TX1 eight units after it was transmitted. The near-end timer, Timer2, is started 612, upon receipt of the third falling edge 650 and terminated 614 upon receipt of the fourth falling edge 660. The time measured is recorded, as T2. Based on the measured timer value, T2, the delay time for the shorter link is established by the equation, $T2=X+\Delta T$. In this example, $T2=5$, and so the shortest path delay is four units.

As is clear from the example presented in FIGS. 5 and 6, this step that determines link delay of the shorter path does not distinguish which link is longer or shorter, D1 or D2. Rather, this step provides the value of the delay of the shorter link. In some embodiments, an additional step can be used to determine which link has the shorter path length using signals emitted by the transceivers. This step may involve the use of known protocols that use time stamping or marking. In some embodiments, the determination of which link is shorter is known a priori.

Additional calculations can be used to convert the measured times of the various timers (e.g., Timer1 that provides the total path delay, and Timer2 that provides the shorter path delay) into path lengths. Note that not all steps of the method need to be practiced, as some of the information on link lengths may be known a priori, and interest may lie in determining the timing information, total link delay, shorter link delay, etc. In these cases, various steps of the method can be used to "fill-in" missing information on relative path delays or link lengths. In various embodiments, the information of path lengths, latencies (path delay) determined by the method can be stored in the transceivers (210, 220) and also transmitted to any local host (e.g., 218, 228 of FIG. 2A).

Some embodiments of the method operate automatically at startup. Precise and high-resolution (i.e., on the order of one meter, or less in some embodiments) path lengths are possible because, for example, response times of ten nanoseconds or less are possible using known components.

One skilled in the art will appreciate that the method of the present disclosure uses primarily timers, and transmission and receipt of falling edges. The methods therefore do not require the use of time stamps, sending client data traffic or other bit patterns, and/or associated complicated multiple round-trip protocols, although such additional techniques could be used for further purposes. The methods are not reliant on any client traffic, and thus can be completed before client data traffic is applied to the link. Furthermore, the methods do not require that a remote and/or local host or management system be used to initiate the methods, nor does such a host or management systems need to provide any information about the link.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A method implemented by a first transceiver in communication with an optical link, the method comprising:
   storing, at the first transceiver, a total link delay of the optical link;
   receiving, at the first transceiver via a first path of the optical link, a first edge through the optical link and simultaneously starting a wait timer for the total link delay;
   receiving, at the first transceiver via the first path, a second edge through the optical link at a time period after the first edge;
   transmitting, from the first transceiver via a second path of the optical link, a third edge in response to receipt of the second edge;
   transmitting, from the first transceiver via the second path, a fourth edge after the wait timer has elapsed; and
   determining a first indication of a shorter path delay of the first and second paths based on elapsed time between the third and fourth edges.

2. The method of claim 1, wherein transmitting the third edge comprises transmitting the third edge delayed by a response time after the receipt of the second edge; and wherein determining the shorter path delay comprises subtracting the response time from the elapsed time.

3. The method of claim 1, wherein the fourth edge is transmitted after the third edge.

4. The method of claim 1, further comprising initially determining the total link delay in the optical link.

5. The method of claim 4, wherein initially determining the total link delay in the optical link comprises:
   transmitting, from the first transceiver via the first path, an initial edge and simultaneously starting an initial timer at the first transceiver;
   receiving, at the first transceiver via the second path, a subsequent edge and simultaneously terminating the initial timer, the subsequent edge being associated with transmission through the optical link in response to receipt of the initial edge; and
   determining the total link delay of the first and second paths based on elapsed time of the initial timer.

6. The method of claim 1, further comprising determining a total link length based on the total link delay.

7. The method of claim 6, wherein determining the total link length based on the total link delay comprises calculating the total link length based on multiplication of the total link delay times a speed of light at an effective refractive index associated with the optical link.

8. The method of claim 1, the first transceiver being in communication with a second transceiver through the optical link, wherein storing, at the first transceiver, the total link delay of the optical link comprises receiving, at the first transceiver, the total link delay from the second transceiver; and configuring a wait time for the wait timer at the first transceiver equal to the total link delay.

9. The method of claim 1, further comprising determining a shorter path length based on the shorter path delay.

10. The method of claim 9, further comprising determining that the first path from the first transceiver through the optical link has the shorter path length.

11. The method of claim 10, wherein determining that the first path has the shorter path length comprises making the determination using a time stamp.

12. The method of claim 1 implemented by a second transceiver in communication with the first transceiver via the optical link, the method further comprising:
    storing, at the second transceiver, the total link delay in the optical link;
    transmitting, from the second transceiver via the first path of the optical link, the first and second edges separated by an average of the total link delay;
    receiving, at the second transceiver via the second path of the optical link, the third edge and simultaneously starting a first timer, the third edge being associated with transmission through the optical link in response to receipt of the second edge;
    receiving, at the second transceiver via the second path, the fourth edge and terminating the first timer, the fourth edge being associated with transmission through the optical link after the total link delay in response to receipt of the first edge; and
    determining a second indication of the shorter path delay of the first and second paths based on elapsed time of the first timer.

13. The method of claim 12, further comprising initially determining, at the second transceiver, the total link delay in the optical link.

14. The method of claim 13, wherein initially determining, at the second transceiver, the total link delay in the optical link comprises:
    transmitting, from the second transceiver via the first path, an initial edge and simultaneously starting an initial timer at the second transceiver;
    receiving, at the second transceiver via the second path, a subsequent edge and simultaneously terminating the initial timer, the subsequent edge being associated with transmission through the optical link in response to receipt of the initial edge; and
    determining the total link delay of the first and second paths based on elapsed time of the initial timer.

15. The method of claim 13, comprising communicating, from the second transceiver, the total link delay to the first transceiver for storing.

16. A first transceiver in communication with an optical link, the first transceiver comprising:
    an optical interface in communication with first and second paths of the optical link;
    memory having a wait timer and storing a wait time, the wait time equal to a total link delay in the optical link; and
    a processing unit connected to the optical interface and the memory, the processing unit being configured to:
        receive, at the optical interface via the first path, a first edge through the optical link and simultaneously start the wait timer for the wait time;
        receive, at the optical interface via the first path, a second edge through the optical link at a time period after the first edge;
        transmit a third edge from the optical interface via the second path in response to receipt of the second edge;
        transmit a fourth edge from the optical interface via the second path after the wait time equal to the total link delay; and
        determine a first indication of a shorter path delay of the first and second paths based on elapsed time between the third and fourth edges.

17. The first transceiver of claim 16, wherein the processing unit is configured to calculate a total link length based on multiplication of the total link delay times a speed of light at an effective refractive index associated with the optical link.

18. The first transceiver of claim 16, wherein the processing unit is configured to receive, at the first transceiver, the total link delay from a second transceiver; and to configure the wait time at the first transceiver equal to the total link delay.

19. The first transceiver of claim 16, wherein the third edge is associated with a transmission delayed by a response time after the receipt of the second edge; and wherein the processing unit is configured to subtract the response time from an elapsed time of a first timer to determine the shorter path delay.

20. The first transceiver of claim 16, wherein the processing unit is configured to determine a shorter path length based on the shorter path delay.

* * * * *